United States Patent [19]
Maciulewicz

[11] Patent Number: 5,927,398
[45] Date of Patent: Jul. 27, 1999

[54] DEVICE IDENTIFICATION SYSTEM FOR HVAC COMMUNICATION NETWORK

[75] Inventor: Stephen M. Maciulewicz, Auburn, N.Y.

[73] Assignee: Carrier Corporation, Syracuse, N.Y.

[21] Appl. No.: 08/670,196

[22] Filed: Jun. 22, 1996

[51] Int. Cl.⁶ .................................................. F25B 29/00
[52] U.S. Cl. ......................... 165/209; 165/208; 165/217; 236/1 B; 236/1 C; 236/51; 364/132; 364/505; 395/200.38; 395/200.75
[58] Field of Search .................................... 165/209, 208, 165/205, 217; 236/1 B, 1 C, 51; 364/132, 505; 395/200.38, 200.75

[56] References Cited

U.S. PATENT DOCUMENTS

| | | | |
|---|---|---|---|
| 4,949,337 | 8/1990 | Aggers et al. | 370/85.4 |
| 5,039,980 | 8/1991 | Aggers et al. | 340/506 |
| 5,390,206 | 2/1995 | Rein et al. | 375/1 |
| 5,435,147 | 7/1995 | Mochizuki et al. | 165/209 |
| 5,581,478 | 12/1996 | Cruse et al. | 364/505 |
| 5,630,324 | 5/1997 | Yoshida et al. | 165/205 |
| 5,647,223 | 7/1997 | Wada et al. | 165/209 |
| 5,682,949 | 11/1997 | Ratcliffe et al. | 165/209 |

*Primary Examiner*—John K. Ford

[57] ABSTRACT

A system is disclosed for conveying network identifications of HVAC master controllers within an HVAC communication network to their respective zone controllers. Each master controller addresses and transmits its network identification to zone controllers within a predefined range of network addresses unless it encounters another master controller. The network identifications are used by the zone controllers to identify messages from their respective master controllers.

22 Claims, 7 Drawing Sheets

FIG.2

ZONE CONTROLLER DATA PACKET:

FIG.6

MASTER CONTROLLER DATA PACKET:

DEVICE IDENTIFICATION SYSTEM FOR HVAC COMMUNICATION NETWORK

BACKGROUND OF THE INVENTION

This invention relates to communications that occur between a master controller and its respective zone controllers within an HVAC communication network. In particular, this invention relates to the manner in which a master controller conveys a network identification of itself to its respective zone controllers within an HVAC communication network that may include a number of different master controllers and respective zone controllers.

Commonly assigned U.S. patent application Ser. No. 670,197 now U.S. Pat. No. 5,751,572 entitled "HVAC Communication Network" filed in the name of Stephen M. Maciulewicz on even date herewith sets forth a particular communication scheme between a master controller and its respective zone controllers. The scheme is premised on each zone controller having stored network address of its respective master controller. Each zone controller can identify whether a message from a particular device on the network is in fact a message from its respective master controller by checking whether a field of information in the message from a master controller contains the stored network address of its respective master controller. This communication scheme works well when there are no changes to be made in the stored network addresses of the master controllers in their respective zone controllers. There are, however, instances where the network address of one or more zone controllers might change when devices are, for instance, added to the communication network requiring possible reconfiguration of the network. In such cases all zone controllers associated with such master controllers will need to have their stored master controller network addresses changed.

OBJECTS OF THE INVENTION

It is an object of the invention to provide an HVAC communication system with a capability to quickly and easily provide appropriate device identifications of master controllers to respective zone controllers when the same becomes necessary.

SUMMARY OF THE INVENTION

The above and other objects of the invention are preferably achieved by a process executable by a microprocessor within each master controller connected to a bus of an HVAC network communication system. The process includes addressing devices preferably connected to the network communication system bus beginning with the next incremental address occurring in a given direction from the system bus address of the particular master controller. Each such addressed device is queried as to whether it is a zone controller. In the event that the device response indicates that it is a zone controller, then the master controller proceeds to preferably convey its network address to the zone controller. The conveyance of the network address of the master controller may be conditioned on an inquiry as to whether the zone controller has already stored the particular network address of the master controller.

The master controller preferably addresses all devices within a predefined range of addresses of the master controller. The master controller also preferably terminates any further incremental addressing of devices on the system bus in the event that the query of a particularly addressed device indicates the device to be another master controller.

BRIEF DESCRIPTION OF THE DRAWINGS

Other objects and advantages of the present invention will be apparent from the following description in conjunction with the accompanying drawings, in which.

A DESCRIPTION OF THE PREFERRED EMBODIMENT

Figure 1:
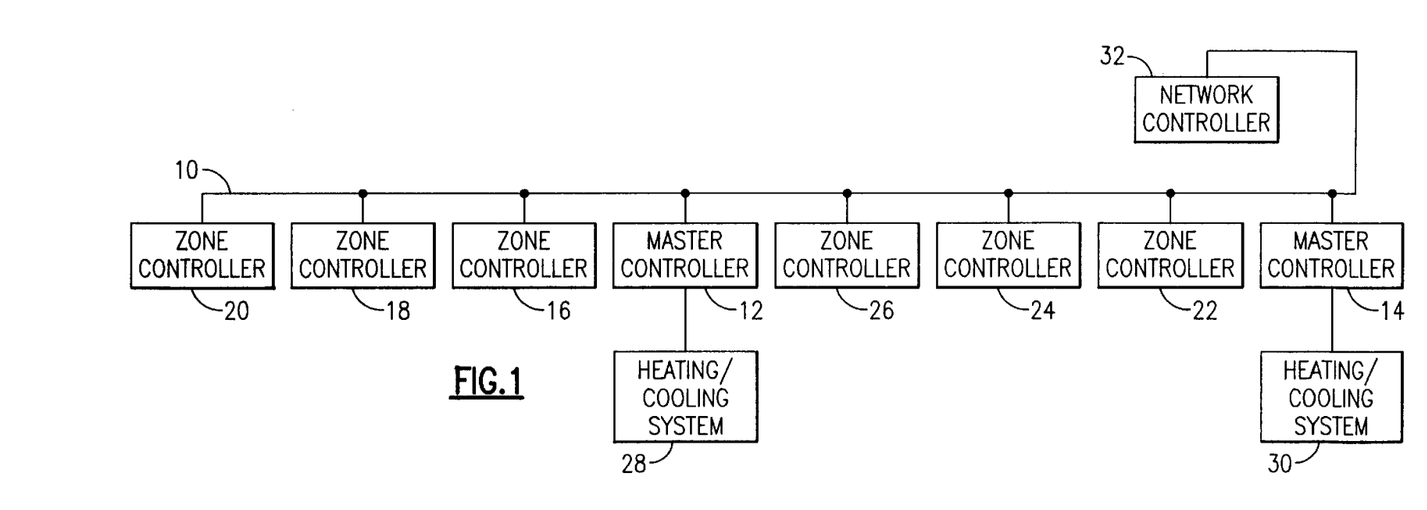
FIG. 1 is an overall diagram of an HVAC communication network including two master controllers and several zone controllers associated therewith.

Referring to FIG. 1, a communication bus 10 is connected respectively to master controllers 12 and 14. Each master controller uses the communication bus 10 to communicate with zone controllers associated therewith. In particular, master controller 12 preferably communicates with zone controllers 16, 18, and 20 whereas master controller 14 preferably communicates with zone controllers 22, 24, and 26. Each master controller, 12 and 14, is also seen to be in communication with a respective heating/cooling system 28 or 30. As will be explained hereinafter, the heating/cooling system 28 provides conditioned air to the respective zones indicated in dotted outline form of the zone controllers 16, 18, and 20 whereas the heating/cooling system 30 performs the same function for zones associated with zone controllers 22 through 26. Each master controller 12 and 14 also may receive information on the control bus 10 from a network system controller 32. The information from the network system controller may, for instance, include an emergency shut down notification to each master controller on the communication bus 10. Such an emergency shut down notice may, for instance, occur if a fire is detected in the building being heated or cooled by the respective heating/cooling systems 28 and 30.

Figure 2:
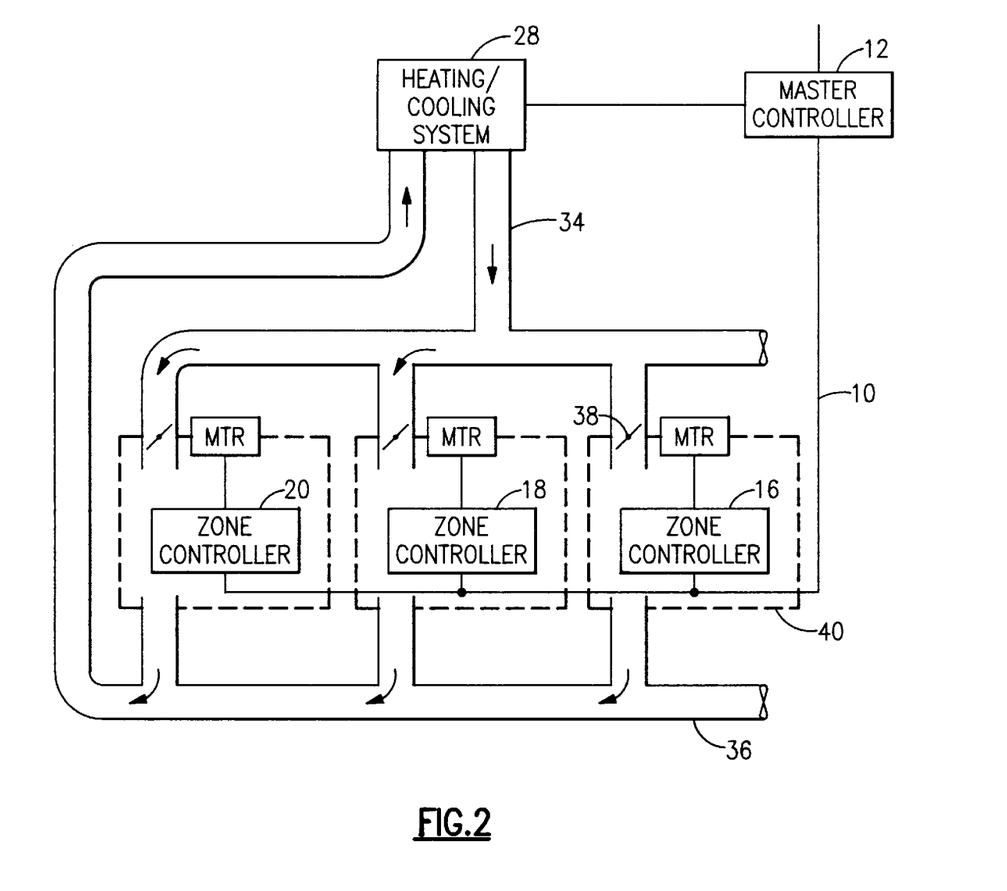
FIG. 2 is a diagram of a particular master controller and its associated zone controllers having dampers within respective zones.

Referring to FIG. 2, the heating/cooling system 28 is illustrated relative to the master controller 12 and the respective zone controllers 16, 18, and 20. The heating/cooling system provides conditioned air to each zone associated with a zone controller via an air supply duct 34. Each zone 40 is seen to include a passage to a return duct 36, which returns air to the heating/cooling system 28. The amount of conditioned air provided to a particular zone is dictated by the position of a damper in the respective portion of the duct 20 feeding conditioned air to the respective zone. For instance, zone controller 16 controls the position of a damper 38 providing air to a zone 40.

Figure 3:
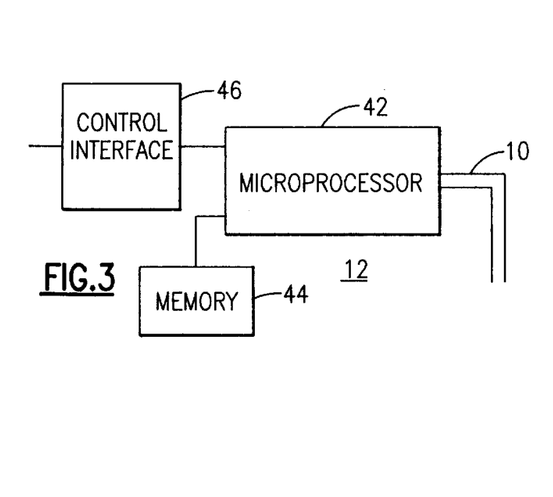
FIG. 3 is a diagram of the microprocessor configuration of a typical master controller.

Referring to FIG. 3, the master control 12 is seen to include a programmed microprocessor 42 connected to the communication bus 10. The programmed microprocessor 42 downloads packets of information from the communication bus 10 and stores the same in a memory 44 for further processing. The programmed microprocessor 42 is connected to a control interface 46 which selectively activates the heating/cooling system 28 in response to control signals from the microprocessor 42. The control interface 46 also includes the status of the various functions of the heating/cooling system, which can be queried by the microprocessor 42.

Figure 4:
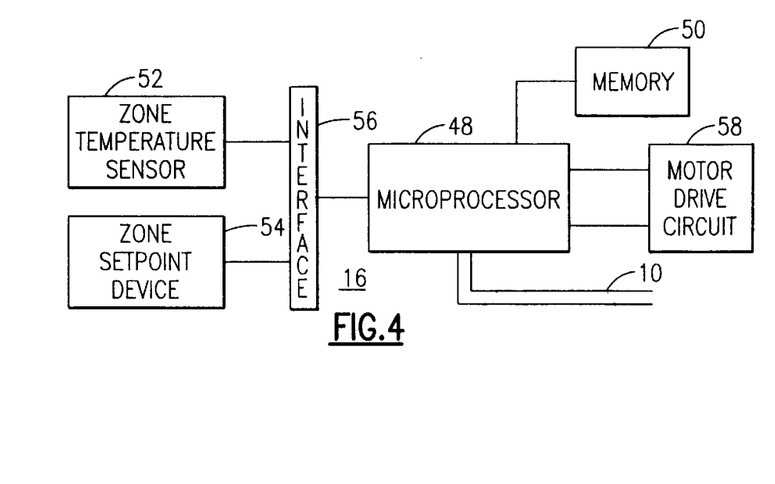
FIG. 4 is a diagram of the microprocessor configuration within one of the zone controllers.

Referring to FIG. 4, the zone controller 16 is seen to include a programmed microprocessor 48, which receives and transmits packets of information over the communication bus 10 to, for instance, the master controller 12. The received packets are normally stored in a memory 50 associated with the microprocessor 48. The microprocessor 48 is furthermore connected to a zone temperature sensor 52 and a zone set point device 54 via an interface 56. It is to be appreciated that the temperature values defined by the zone temperature sensor 52 and the set point device 54 are periodically read and stored for use by the microprocessor 48. In addition to the reading and storing of information from the interface 56, the microprocessor also issues control signals to a motor drive circuit 58 associated with the motor for the damper 38 of FIG. 2. It is to be appreciated that the zone controller configuration of FIG. 4 is similarly duplicated in the other zone controllers connected to the communication bus 10.

Figures 5, 5A:
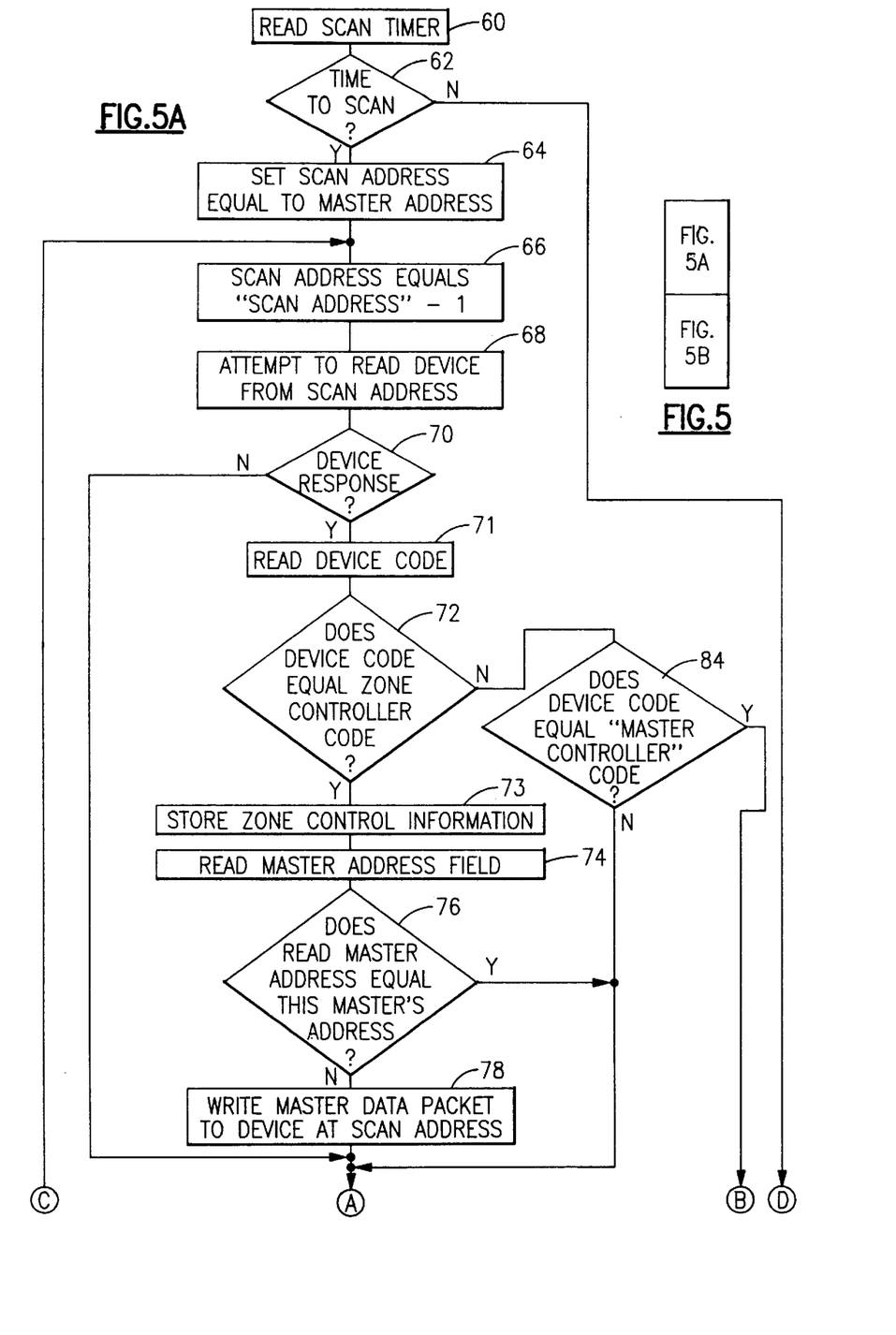
FIGS. 5, 5A and 5B comprise a flowchart of a software program executable by the microprocessor of FIG. 3, which defines the manner in which communication is established by a master controller with respect to its zone controllers over the communication network set forth in FIG. 1.

Referring to FIG. 5A, a program executable by a microprocessor within a master controller for implementing communications with respect to its zone controllers is illustrated. It is to be understood that such a program would be, for instance, executable by the microprocessor 42 within the master controller 12. The program begins with a step 60 wherein the microprocessor reads a scan timer that has been established for the purpose of defining periodic intervals during which the master controller is going to specifically read information from its respective zone controllers. The microprocessor proceeds to a step 62 and inquires as to whether or not the timer indicates the elapse of the specified scan period. The microprocessor proceeds upon the elapse of the specified scan period to a step 64 and sets a "scan address" equal to the particular master controller's address. This would be the network address of the master controller 12 that is used by other devices on the communication bus 10 for the purpose of communicating with this master controller.

Figure 6:
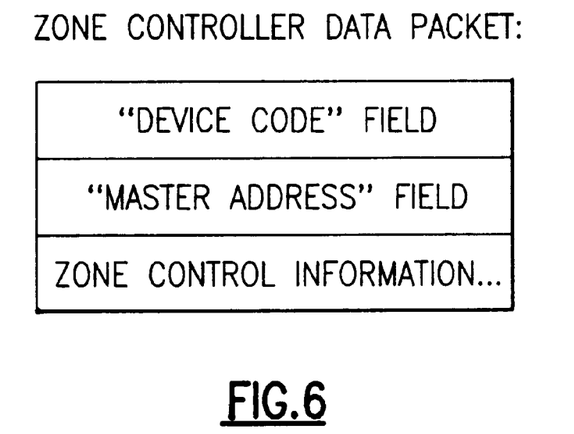
FIG. 6 is an illustration of the configuration of a data packet transmitted by a zone controller over the communication network set forth in FIG. 1.

The microprocessor proceeds in a step 66 to decrement the scan address established in step 64. The microprocessor thereafter attempts a read of any device on the communication bus 10 having the particular scan address. Referring to FIG. 1, it will be remembered that the zone controllers associated with a particular master controller will have lower addresses than their respective master controller. This will mean, for instance, that the zone controller 16 associated with the master controller 12 will be addressed at the next network address down from that of the master controller 12. Referring again to FIG. 5A, the microprocessor within the master controller 12 awaits a device response in step 70. Assuming a device has responded at the particular scan address, the microprocessor will proceed to a step 71 and read a particular device code field of information from a data packet stored in a communication buffer. The communication buffer will preferably be established in a memory such as memory 44 associated with the microprocessor 48. It is to be understood that communication buffers are well known in the art. As will be explained in detail hereinafter, the data packet in the communication buffer will preferably include several fields of information that are to be read and analyzed by the microprocessor within each master controller in the event that the data packet is from a zone controller. An example of how such a zone controller data packet may be configured is illustrated in FIG. 6. The progressive analysis of such a data packet by a master controller's microprocessor will be explained hereinafter.

The microprocessor will proceed in a step 72 to inquire as to whether the read device code field contains a device code that indicates that a zone controller has been addressed.

Figure 7:
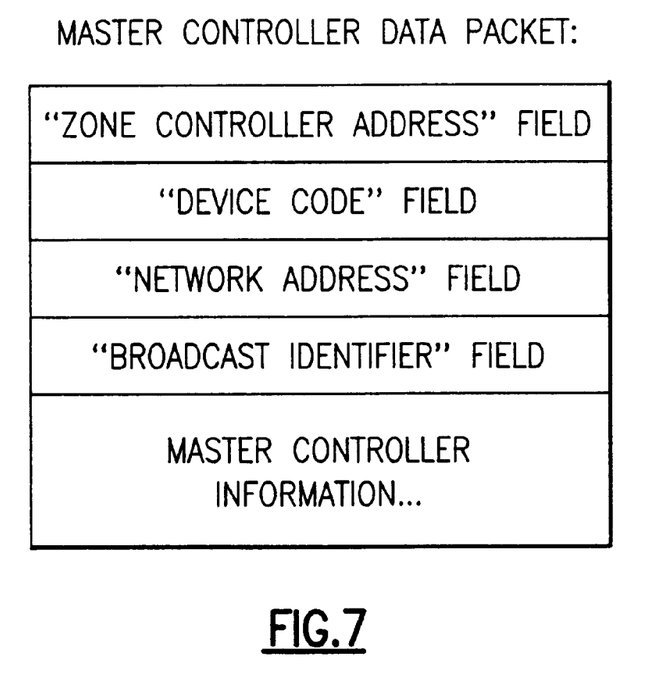
FIG. 7 is an illustration of the configuration of a data packet transmitted by a master controller over the communication network set forth in FIG. 1.

Assuming that the master controller 12 has read a zone controller from the particular field in the data packet, the microprocessor will proceed to a step 73 and both read and store certain zone control information from the data packet. It is to be understood that the zone control information that is stored is preferably zone information such as zone damper position, zone temperature setting and the current temperature of the zone. This information will preferably appear in particular information fields within the data packet. The microprocessor will now proceed to a step 74 and read a "master address" field from the device packet in the communication buffer. It is to be appreciated that a zone controller downstream of the master controller 12 will preferably contain that particular master controller's network address stored in its memory. The read master address is compared to the particular master controller's address in a step 76. In the event that the read master address from the zone controller does not equal the particular master controller's address, then the microprocessor will proceed to a step 78 and write the master controller's data packet to the device at the scan address. An example of how such a master data packet is preferably configured is illustrated in FIG. 7. This master data packet is seen to include the following fields: a zone address field, a device code field, a network address field and, finally, a broadcast field. The zone address field will include the particular address of the zone controller being written to. This address is of course available as a result of having just recently addressed the zone controller. The device code field will contain a code indicating that the packet is from a master controller. The network address field will contain the particular master controller's network address. The broadcast field will not contain any particular code as a result of the microprocessor executing the step 78. The significance of this field of information will be explained hereinafter.

As will also be explained in detail hereinafter, the zone controller receiving this written master controller's data packet will store the particular master controller's network address in its master address field within the zone controller's data packet so that the next time the zone controller's data packet is read in step 68, the particular master controller's network address will be present in the field. Referring again to step 78, the master controller's microprocessor will proceed from step 78 to a step 80 and read the scan range for the particular master controller. This scan range will be an assigned scan range for the particular master controller that can be used to compute a minimum address for scanning purposes. In the event that the scan range has not been exceeded, the microprocessor within the master controller will proceed out of step 82 and return to step 66 wherein the scan address is again decremented by one. As has been previously discussed, the microprocessor will attempt to read a device at the new scan address. If a device is noted, it will read the device code from the particular packet of transmitted information from the addressed device.

Referring to step 76, in the event that the master address read from a particular data packet equals the master's address for the particular master controller, the microprocessor will proceed to check the scan address against the scan range in steps 80 and 82. The microprocessor will proceed back to step 66 as has been previously discussed unless the present scan address is at the scan range limit. In the event that the scan address is at the scan range limit, the microprocessor will proceed to a step 86 and process all of the zone control information that has been stored pursuant to execution of step 83 for each zone controller having the correct master address.

Referring to step 70, in the event that there is no device response at the scan address, the microprocessor will proceed to step 80 and inquire as to whether the scan range has been exceeded in step 82. In the event that it has, the microprocessor will proceed to step 86 as has been previously discussed. The microprocessor will otherwise return to step 66 and decrement the scan address.

Referring to step 72, in the event that the device code does not indicate a zone controller device code, the microprocessor will proceed along a "no" path to a step 84 and inquire as to whether the device code field in the packet from the addressed device indicates a master controller device code. In this regard, the addressing by one master controller of another master controller will cause the latter master controller to provide a data packet of information back to the inquiring master controller that will have a device code field indicating that it is a master. In the event that such occurs, the microprocessor for the inquiring master controller will proceed out of step 84 to the step 86. It is to be appreciated that at this point all scanning will have been completed of the zone controllers downstream of the inquiring master controller. Referring again to step 84, in the event that the inquiring master controller has not encountered another master controller, the microprocessor will proceed along the no path out of step 84 to step 80 and again read the scan range and thereafter determine whether the scan range is at the scan range limit in a step 82. It is to be appreciated that at some point either the scan range is going to have been exceeded or the master controller will have encountered another master controller. In either event, the microprocessor for the inquiring master controller will proceed to step 86 and process the zone control information that has been received from the scanned zone controllers associated with the particular master controller.

Figure 5B:
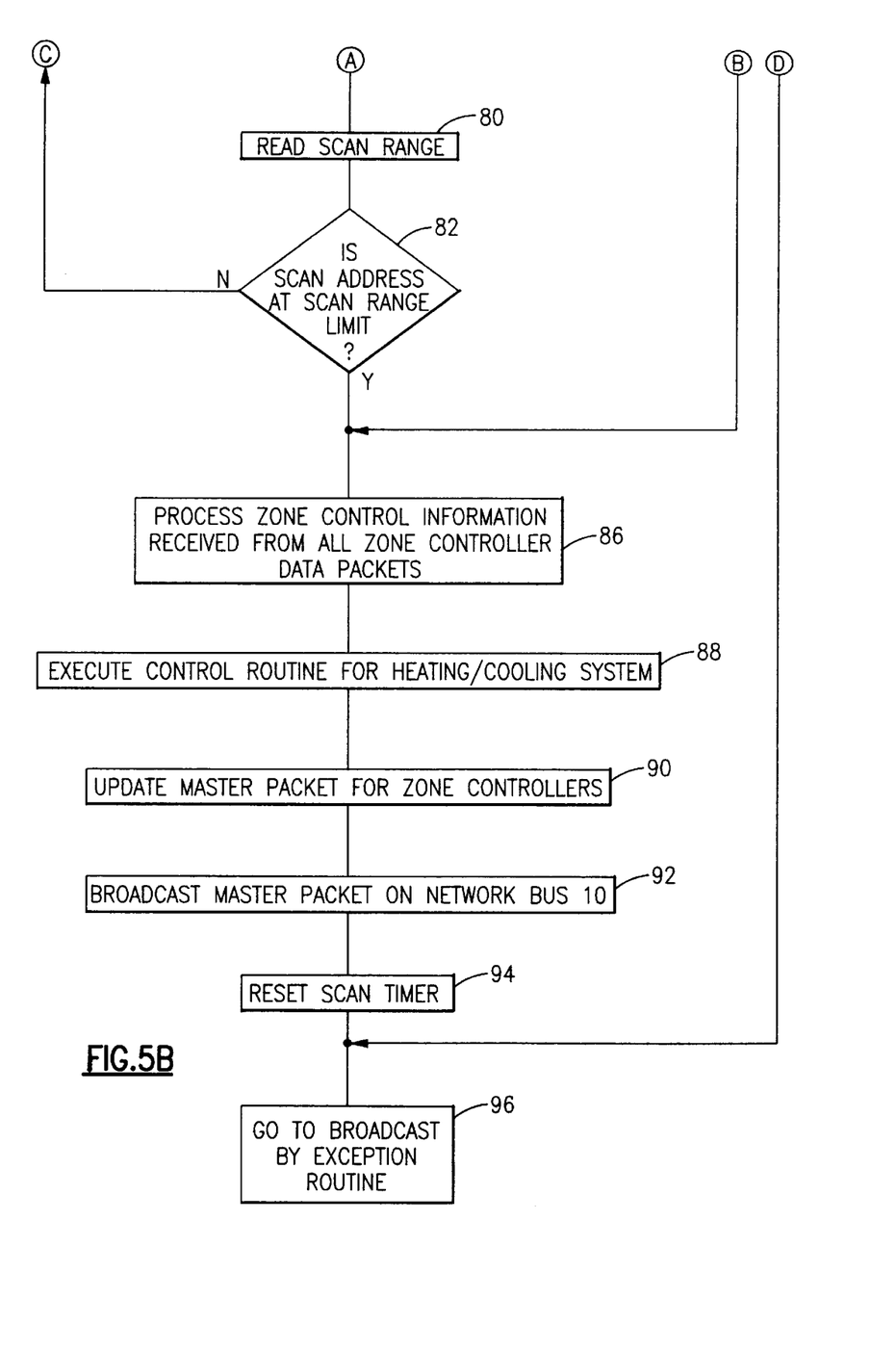

The microprocessor proceeds from processing the control information from all scanned zone controllers to a step 88 wherein a control routine is executed for controlling the heating/cooling system associated with the master controller. This control routine will take into account any change in control parameters for the particular heating/cooling system dictated by the processed zone control information of step 86. Following execution of the control routine, the microprocessor for the particular master controller will proceed to a step 90 and update the master controller's packet, which is normally sent to the zone controllers. This particular master data packet will have the same fields previously mentioned with respect to the master controller data packet sent in step 78. The zone controller address field will however, in this case, preferably be blank. The device code field will contain a predetermined code indicating that the packet is from a master controller. The "network address" field will contain the particular master controller's network address. The "broadcast field" will now contain a general broadcast code indicating that the master controller packet is being simultaneously made available to all zone controllers. The master controller will proceed from step 90 to a step 92 and transmit the thus formed master controller packet on the network communication bus 10. As will be explained in detail hereinafter, each zone controller attached to the communication bus 10 will download the master controller packet and read the aforementioned fields of information to determine the relevance of the packet to the particular zone controller.

The master controller's microprocessor will proceed from step 92 to a step 94 and reset the scan timer before proceeding to a broadcast by exception routine in a step 96. It is to be appreciated that while the microprocessor proceeds to the thus noted routine, the scan timer that has been reset in step 94 will again begin to clock its scan time. It is to be appreciated that the scan program will execute frequently so as to continually note whether the scan timer indicates an elapse of the scan time. Until the scan time has elapsed, the microprocessor will simply exit step 62 and proceed to the broadcast by exception routine of step 96.

Figure 8:
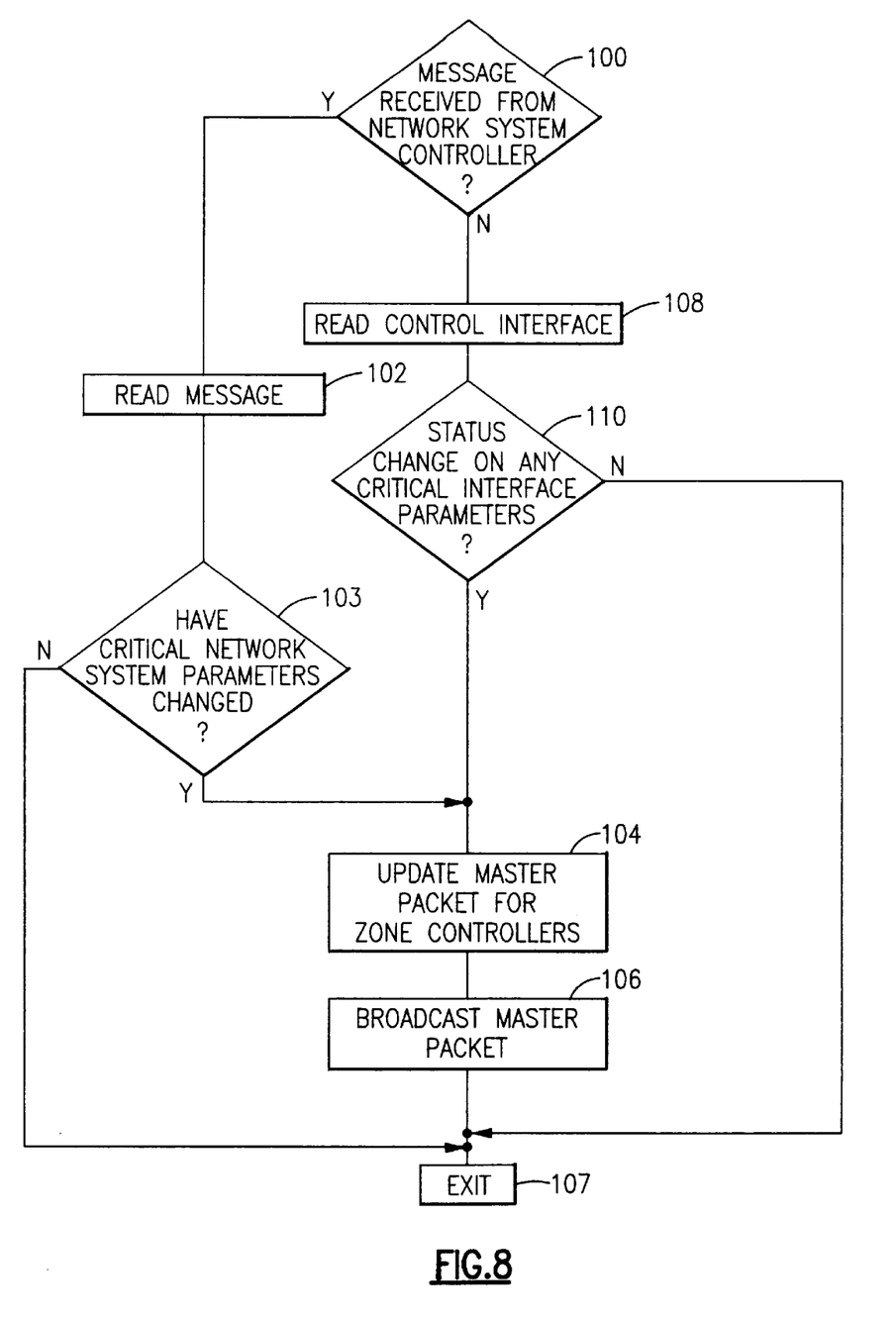
FIG. 8 is a flowchart of a broadcast software routine executable by the microprocessor of FIG. 3.

Referring now to FIG. 8, the "broadcast by exception" routine executed by each master controller is illustrated. This routine begins with a step 100 wherein an inquiry is made as to whether or not a message has been received from the network system controller 32. It will be remembered that the network system controller 32 is simply a network control device attached to the network communication bus 10 in FIG. 1. This network system controller could be any of a number of different devices attached to the communication bus 10 so as to establish a communication capability with one or more master controllers or any other device attached to the communication bus 10. The master controller microprocessor simply notes whether or not a message has been received from such a device. In the event that a message has been received from the network system controller, the microprocessor for the master controller will proceed to a step 102 and read the message from the network system controller. It is to be understood that this message could contain, for instance, an emergency shut down notice. Such a notice would preferably appear in a field of a data packet received from the network system controller. This field would be read and the status change in the critical network system parameter would be noted in step 103. The microprocessor would proceed in such a case along the yes path to step 104 and update the master controller's data packet. The updated packet may include a notice as to the change in the critical network system parameter as the same is to be encoded for purposes of transmission and receipt by each zone controller. This may, for instance, be set forth in a particular field dedicated to emergency messages from the master controller. The updated packet may, in the alternative, contain a specific instruction that changes a particular operating parameter in each zone controller as a result of the noted change in the network system parameter. For example, an instruction for closing the zone damper might issue in the event of a fire emergency message from the network system controller. The updated packet would also include the appropriate information in the device code field, the master address field and the broadcast field as has been previously discussed relative to step 90. The microprocessor for the master controller would immediately send any such updated master packet to the respective zone controllers in a step 106. It is to be appreciated that such a message would not contain a particular address for any zone controller, but would merely have the field coding scheme previously discussed in step 92 of the scan program. Referring again to step 103, in the event that the message from the network system parameter is not critical, the microprocessor would proceed to exit the broadcast by exception routine in a step 107.

Referring again to step 100, in the event that a receipt has not been noted from the network system controller, the microprocessor for the master controller will proceed to a step 108 and read the control interface data for the particular heating/cooling system being controlled by the master controller. The microprocessor will proceed in a step 110 to examine whether a status change has occurred to any critical control interface parameters. Such critical parameters could be for instance the mode of operation such as a fan mode versus heating mode or cooling mode. Any such change in mode of operation would be deemed important enough to require an immediate broadcast to the zone controllers. The master packet would be updated to include such a change in the critical interface parameters in step 104 and the updated packet would be immediately broadcast to the zone controllers in step 106. The microprocessor would thereafter proceed to exit step 107.

Figure 9:
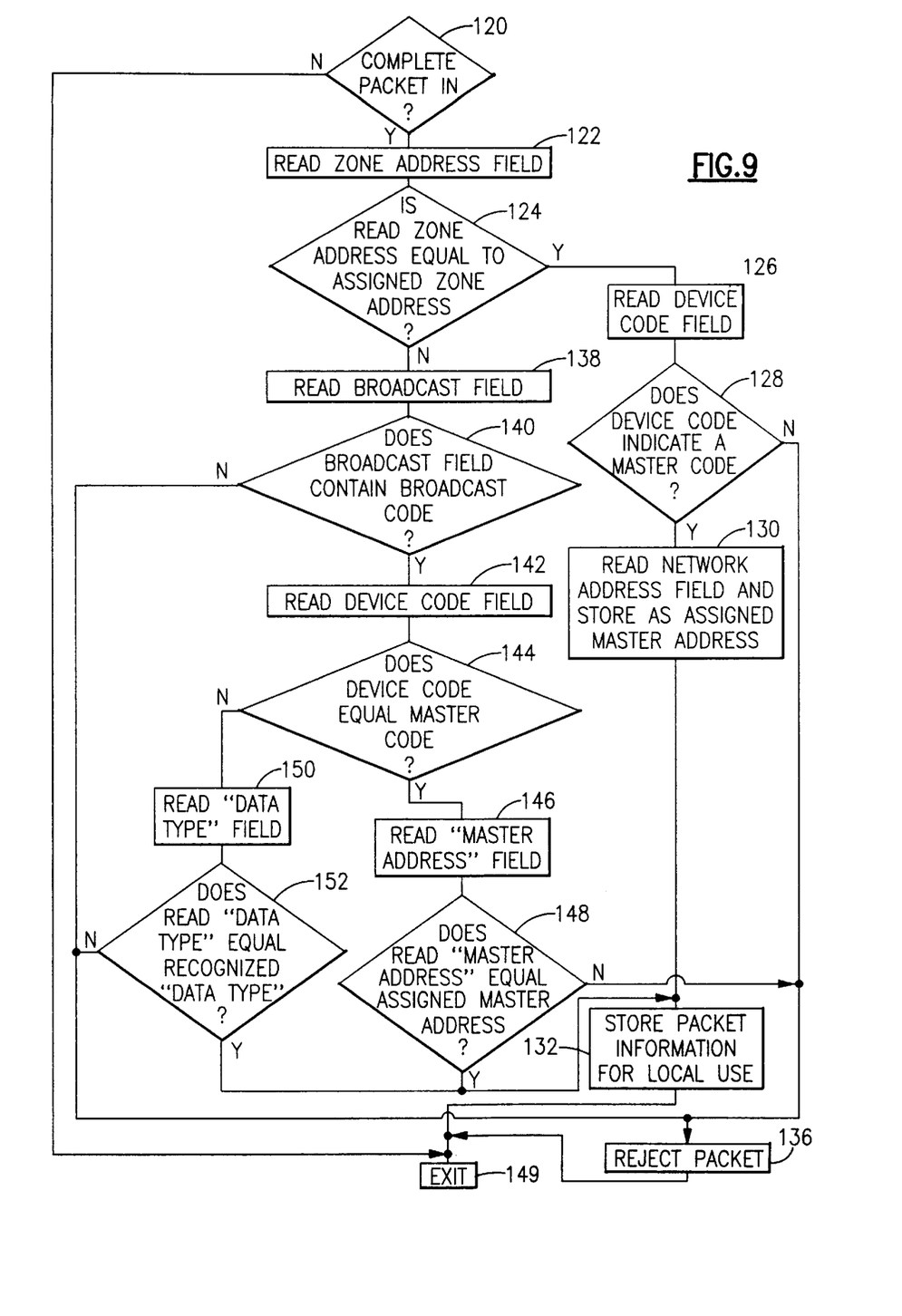
FIG. 9 is a flowchart of a software program executable by the microprocessor in each of the zone controllers, which is responsive to the communications issued by the software program of FIGS. 5A and 5B.

Referring to FIG. 9, a software program executable by the microprocessor in each zone controller is illustrated. This program begins with a step 120 wherein a microprocessor in a zone controller inquires as to whether a complete packet has been received from the communication bus 10. When this occurs, the microprocessor for the particular zone controller proceeds to a step 122 and reads the zone address field. It will be remembered that data packets from the master controllers on the communication bus 10 will include a zone controller's address in a particular address field if a direct write is to be made to a particular zone controller.

The microprocessor for the particular zone controller will proceed to a step 124 and inquire as to whether or not the value of the read zone address field equals an assigned zone address to the particular zone controller. Assuming that a direct write has been attempted by a master controller to the particular zone controller, the yes path will be pursued out of step 124 and the device code field will be read in a step 126. Inquiry will next be made in a step 128 as to whether the device code identification field indicates that the packet is from a master controller. It will be remembered that a "master packet" code will have been entered in the device code field by a master controller preparing or updating a master data packet. In the event that a master packet code is indicated in the device code field, the microprocessor of the zone controller will proceed to a step 130 and read the network address of the master controller from the network address field and store the same as the "assigned master address". The microprocessor will proceed to store the remaining pertinent information from the packet of received information of FIG. 7 in a step 132 before exiting from the packet analysis program in a step 134. This information can be used by the zone control microprocessor to, for instance, control the one or more damper motors for the zone. Referring again to step 128, in the event that the device code field does not indicate that a master packet has been received, the microprocessor for the zone controller will proceed out of step 128 to a step 136 and reject the packet of received information. The rejection of a packet will eventually cause the microprocessor to delete the packet that has been received by the zone controller in accordance with well-known means for handling packets of received information.

It is to be appreciated from the above that a zone controller will have received an assigned master address in a step 130 once it has received a direct write from its respective master controller. The zone controller will maintain this particular assigned master address until such time as a further direct write has occurred from a master controller on the communication bus 10 seeking to define its network address as the assigned master address for the particular zone controller.

As will now be explained, the analysis program of FIG. 9 can respond to a broadcast packet of information on the communication bus 10 from a respective master controller without having to be specifically addressed. Referring to step 120, when a complete packet is in, the microprocessor for the zone controller will proceed to step 122 and read the zone address field and thereafter inquire as to whether the zone address field is equal to the assigned zone address for the particular zone controller. In the event that the field is blank or the zone address does not correspond to the assigned zone address, the microprocessor will proceed to step 138 and read the broadcast field from the received packet. This field is examined for conformance with the "general broadcast code" used by the master controller to generate the master data packets in either step 90 or step 104. If a general broadcast code is indicated in step 140, the microprocessor proceeds to a step 142 and reads the "device code" field and inquires in a step 144 as to whether the device code field equals the device code set aside for master controllers.

In the event that a device code does equal the master controller code, the microprocessor for a zone controller will proceed to a step 146 and read the "network address" field of the data packet. The microprocessor for the zone controller will next inquire in step 148 as to whether the read network address equals the assigned master address for the particular zone controller. It will be remembered that the zone controller will have previously been assigned a master address by a master controller in step 130. In the event that the master address equals the assigned master address, the microprocessor for the zone controller will proceed to step 132 and store the packet of information for local use. Referring again to step 148, in the event that the master address is not the same as the assigned master address for the particular zone controller, the microprocessor will proceed along the no path to step 136 and reject the packet of information that has been thus analyzed. The microprocessor will then exit the process of FIG. 9 in step 149.

Referring again to step 140, in the event that the broadcast field does not indicate a general broadcast, the microprocessor will proceed from step 140 to step 136 and reject the packet of information before proceeding to exit step 149. Referring to step 144, in the event that the device code does not equal the master code, the microprocessor for the zone controller will proceed to a step 150 and read a "data type" field from the packet. If the "data type" field indicates that it is a data type recognized by the local zone controller, then the microprocessor will proceed through step 152 and store the packet of information for local use in step 142. In the event that the data type field does not indicate a recognized data type, then the microprocessor will proceed along the no path out of step 152 to step 136 and reject the packet before proceeding to the exit step 149. Referring again to step 120, it is to be noted that the microprocessor will often run the packet analysis program of FIG. 9. Each time the program executes, an inquiry will be made as to whether a complete packet of information has been received and stored in the communication buffer established by the zone controller's microprocessor. The microprocessor will proceed to the exit step 149 in the event that a complete data packet is not available for analysis.

It is to be appreciated from the above that a microprocessor in a zone controller will have previously learned the particular network address of its respective master controller and will have subsequently been able to either receive a direct write from its master controller or a generally broadcasted message from its master controller. In either event, the zone controller will be operative to store a packet of information from the master controller for the purpose of controlling the local zone. The zone controller can also receive a broadcast from other than its respective master controller and process the thus received packet of information if in fact it corresponds to a data type of packet that is recognized by the zone controller. This allows for a communication in a general broadcast scheme by other than the zone controllers particular master controller.

It is furthermore to be realized that the zone controller can receive a broadcast message from its respective master controller without awaiting a normal of period of communication dictated by the scan program of the master controller. In this regard, the master controller is at any time able to respond to either an emergency message or a critical parameter change at the control interface with respect to the master controller's HVAC system. In either case, a broadcast message is immediately sent in the form of the master data packet from the particular master controller containing information relating to the situation requiring the immediate broadcast.

It is finally to be appreciated that a particular embodiment of the invention has been described. Alterations, modifications and improvements thereto will readily occur to those skilled in the art. Such alterations, modifications and improvements are intended to be part of this disclosure even though not expressly stated herein and are intended to be within the scope of the invention. Accordingly, the foregoing description is by way of example only and the invention is to be limited only by the following claims and equivalents thereto.

What is claimed is:

1. A process for conveying the identity of a master controller for a heating or cooling system to a series of zone controllers that are to be associated with the master controller wherein the zone controllers control the amount of conditioned air to be provided by the heating or cooling system to particular zones to be heated or cooled and wherein the master controller and its respective zone controllers share a communication system with a plurality of other devices including additional master controllers and zone controllers wherein each device has a communication system address that may be used to address the particular device over the communication system, said process executable by the particular master controller comprises the steps of:

successively incrementing the communication system addresses of devices sharing the communication system which have communication system addresses beginning with the next incremental communication system address occurring in a given direction from the communication system address of the particular master controller;

addressing any device sharing the communication system at each of the successively incremented communication system addresses;

reading a device code from any device responding at each successively incremented communication system address;

inquiring as to whether the device code from the responding device indicates a particular code set aside for identifying any zone controller; and writing an identification of the particular master controller to the addressed device when the device code indicates the addressed device is a zone controller whereby the zone controller will thereafter look for the written identification in further communications from the particular master controller that are not directly addressed to the zone controller.

2. The process of claim 1 wherein the identification of the master controller written to the addressed device is the network address of the master controller used by devices sharing the communication system when communicating with the particular master controller.

3. The process of claim 1 further comprising the step of:

Terminating the addressing of any further devices sharing the communication system when a device response at a particular communication system address indicates that another master controller has been addressed.

4. The process of claim 1 further comprising the step of:

terminating the addressing of any further devices sharing the communication system when the device at the next communication system address to be addressed has a communication system address exceeding the range of addresses to be addressed by the particular master controller.

5. The process of claim 1 wherein said step of addressing devices sharing the communication system beginning with the next incremental communication system address occurring in a given direction from the communication system address of the particular master controller comprises:

waiting for a device response from the addressed device at each incremental communication system address;

proceeding to increment to the next communication system address occurring in a given direction from the communication system address of the master controller when there is no device response to the device currently being addressed; and addressing the device at the so incremented communication system address.

6. The process of claim 5 wherein said step of addressing devices sharing the communication system beginning with the next incremental communication system address further comprises the step of:

inquiring whether the incremented communication system address of the device occurring in a given direction from the communication system address of the particular master controller exceeds a range of addresses to be addressed by the particular master controller; and ceasing to address any further devices sharing the communication system when the incremented communication system address of the next device exceeds the range of addresses to be addressed by the particular master controller.

7. The process of claim I further comprising the step of:

inquiring as to whether a device response includes the identification of the particular master controller; and proceeding to said step of writing the identification of the particular master controller to the addressed device only when the device response does not already include the identification of the particular master controller.

8. A process for conveying the identity of a master controller for a heating or cooling system to a series of zone controllers that are to be associated with the master controller wherein the zone controllers control the amount of conditioned air to be provided by the heating or cooling system to particular zones to be heated or cooled and wherein the master controller and its respective zone controllers share a communication system with a plurality of other devices including additional master controllers and zone controllers wherein each device has a communication system address that may be used to address the particular device over the communication system, said process executable by the particular master controller comprising the steps of:

addressing devices sharing the communication system which have communication system addresses within a predefined range of communication system addresses;

reading a device code from each device responding to said step of addressing devices sharing the communication system;

inquiring as to whether the device code from the responding device indicates a particular code set aside for identifying any zone controller; and     writing an identification of the particular master controller to the addressed device when the device code indicates the addressed device is a zone controller whereby the zone controller will thereafter look for the written identification in further communications from the particular master controller that are not directly addressed to the zone controller.

9. The process of claim 8 wherein the identification of the master controller written to the addressed device is the network address of the master controller used by devices sharing the communication system when communicating with the particular master controller.

10. The process of claim 9 further comprising the step of:

terminating the addressing of any further devices sharing the communication system when a device response at a particular communication system address indicates that another master controller has been addressed.

11. The process of claim 8 wherein said step of addressing devices sharing the communication system which have communication system addresses within a predefined range of communication system addresses comprises the steps of:

waiting for a device response from the addressed device;

proceeding to increment to the next communication system address occurring within the range of communication system addresses when there is no device response to the device currently being addressed; and     addressing the device at the so incremented communication system address.

12. The process of claim 8 further comprising the step of:

inquiring as to whether a device response includes the identification of the particular master controller; and     proceeding to said step of writing the identification of the particular master controller to the addressed device only when the device response does not already include the identification of the particular master controller.

13. A system for facilitating communications between a plurality of HVAC controller devices, each of which has a unique system address that may be used to address a communication to that particular HVAC controller device wherein at least one of the HVAC controller devices is a first particular type of controller device and is to convey an identification of itself to one or more of the other HVAC controller devices that are of a second particular type of controller device, said HVAC controller device of a first particular type conveying an identification of itself comprising:

means for successively incrementing communication system addresses beginning with the next incremental system address occurring in a given direction from the system address of the HVAC controller device conveying an identification of itself;

means for addressing any HVAC controller device at each of the successively incremented system addresses;

means for reading a device code from any HVAC controller device responding at each successively incremented address;

means for inquiring as to whether the device code indicates a second particular type of controller device; and     writing an identification of the HVAC controller device having said reading means and said inquiring means to the addressed HVAC controller device when the device code indicates that the addressed device is the particular type of HVAC controller device.

14. The system of claim 13 wherein the identification of the HVAC controller device written to the addressed device is the system address of the HVAC controller device having said reading means and said inquiring means.

15. The system of claim 13 further comprising:

means within the HVAC controller conveying an identification of itself, for terminating the addressing of any further devices when a device response at a particular system address indicates that another HVAC controller device of the same type has been addressed.

16. The system of claim 13 further comprising:

means within the HVAC controller conveying an identification of itself, for terminating the addressing of any further devices when the device at the next address to be addressed has an address exceeding a particular range of system addresses.

17. The system of claim 13 wherein said means for addressing devices beginning with the next incremental address occurring in a given direction from the system address of the HVAC controller device conveying an identification of itself comprises:

means for checking for a device response from the addressed device at each incremental system address;

means for proceeding to increment to the next system address occurring in a given direction from the communication system address of the HVAC controller device conveying an identification of itself when there is no device response to the device currently being addressed; and     means for addressing the device at the so incremented communication system address.

18. The system of claim 17 wherein said means for addressing devices beginning with the next incremental system address further comprises the step of:

means within the HVAC controller conveying an identification of itself, for inquiring whether the incremented system address of the device occurring in a given direction from the system address of the HVAC controller device conveying an identification of itself exceeds a range of addresses to be addressed by the particular master controller; and     means for ceasing to address any further devices when the incremented system address of the next device exceeds a particular range of addresses.

19. A system for facilitating communications between a plurality of HVAC controller devices, each of which has a unique system address that may be used to address a communication to that HVAC controller device wherein at least one of the HVAC controller devices is a first particular type of controller device and is to convey an identification of itself to one or more of the other HVAC controller devices that are of a second particular type of controller device, said HVAC controller device conveying an identification of itself comprising:

means for addressing HVAC controller devices having system addresses within a predefined range of system addresses;

means for reading a device code from any responding HVAC controller device;

means for inquiring as to whether the device code indicates a second particular type of HVAC controller device; and     means for writing an identification of the HVAC controller device having said reading means and said inquiring means to the addressed HVAC controller device when the device code indicates that the addressed device is the second particular type of controller device whereby the addressed device may use the written identification to identify future communications from the HVAC controller device conveying its identification.

20. The system of claim 19 wherein the identification of the HVAC controller device written to the addressed device is the system address of the HVAC controller device conveying the identification.

21. The system of claim 19 further comprising:

means within the HVAC controller conveying an identification of itself, for terminating the addressing of any further devices when a device response at a particular system address indicates that another HVAC controller device of the first type has been addressed.

22. The system of claim 19 wherein means for addressing devices which have system addresses within a predefined range of system addresses comprises:

means for checking for a device response from an addressed device;

means for proceeding to increment to the next system address occurring within the range of system addresses when there is no device response from the device currently being addressed; and     means for addressing the device at the so incremented system address.

\* \* \* \* \*